United States Patent
Guo et al.

(10) Patent No.: US 12,293,239 B1
(45) Date of Patent: May 6, 2025

(54) PROCESSING TASK DISTRIBUTION AND RECOVERY

(71) Applicant: Morgan Stanley Services Group Inc., New York, NY (US)

(72) Inventors: Tingting Guo, Hong Kong (HK); Tushar Kaistha, Hong Kong (HK); Wing Yan Ip, Hong Kong (HK)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/988,714

(22) Filed: Dec. 19, 2024

(51) Int. Cl.
*G06F 9/50* (2006.01)

(52) U.S. Cl.
CPC .......... *G06F 9/5083* (2013.01); *G06F 9/5038* (2013.01)

(58) Field of Classification Search
CPC .............................. G06F 9/5083; G06F 9/5038
See application file for complete search history.

(56) References Cited

U.S. PATENT DOCUMENTS

| | | | |
|---|---|---|---|
| 10,860,622 B1 | 12/2020 | Florissi | |
| 11,372,687 B1 | 6/2022 | Hollosi et al. | |
| 2019/0312800 A1 | 10/2019 | Schibler et al. | |
| 2021/0097641 A1 | 4/2021 | Iyer et al. | |
| 2021/0312449 A1 | 10/2021 | Butvinik | |
| 2022/0398462 A1* | 12/2022 | Clement | G06N 3/088 |
| 2023/0061162 A1 | 3/2023 | Goska et al. | |
| 2023/0136612 A1 | 5/2023 | Doshi et al. | |
| 2023/0273879 A1 | 8/2023 | Bordelon et al. | |
| 2023/0325725 A1* | 10/2023 | Lester | G06N 3/0455 |
| 2024/0303485 A1* | 9/2024 | Kang | G06N 3/09 |

OTHER PUBLICATIONS

Alejandro Gonzalez, Telemetry Data for Machine Learning Based Scheduling, 2020, Budapest.

* cited by examiner

*Primary Examiner* — Sisley N Kim

(74) *Attorney, Agent, or Firm* — Duane Morris LLP

(57) ABSTRACT

Apparatus and corresponding methods for distributing tasks across various processing devices, such as servers, of a distributed computing environment are disclosed. The embodiments can batch workloads and distribute the tasks to the various processing devices for processing such as to reduce an overall processing time and costs. The embodiments may, additionally or alternatively, monitor actual processing times, and reassign tasks that fail to complete within an expected time frame.

20 Claims, 8 Drawing Sheets

US 12,293,239 B1

PROCESSING TASK DISTRIBUTION AND RECOVERY

TECHNICAL FIELD

The present disclosure relates to computing task distribution, and more particularly, to distributing computing tasks across various processing devices.

BACKGROUND

Many applications today are carried out by computing systems that include multiple processing devices. A cloud-based system may distribute workloads for an application to various hypervisors that execute on various servers. The workloads for the same or different applications may also be batched and distributed as tasks to the various hypervisors according to a policy. Often times, however, the workloads are created unevenly, where workloads executing on one processing device may take longer to complete than workloads executing on another device, thereby increasing overall processing time. Moreover, if the not enough workloads are combined for distribution to a processing device for execution, workload distribution overhead increases thereby increasing overall processing costs. As such, there are opportunities to address task batching and distribution processes within computing systems.

SUMMARY

The appended claims may serve as a summary of the invention.

BRIEF DESCRIPTION OF THE DRAWINGS

Example embodiments will now be described by way of non-limiting examples with reference to the accompanying drawings, in which.

DETAILED DESCRIPTION OF CERTAIN EMBODIMENTS

Figure 1:
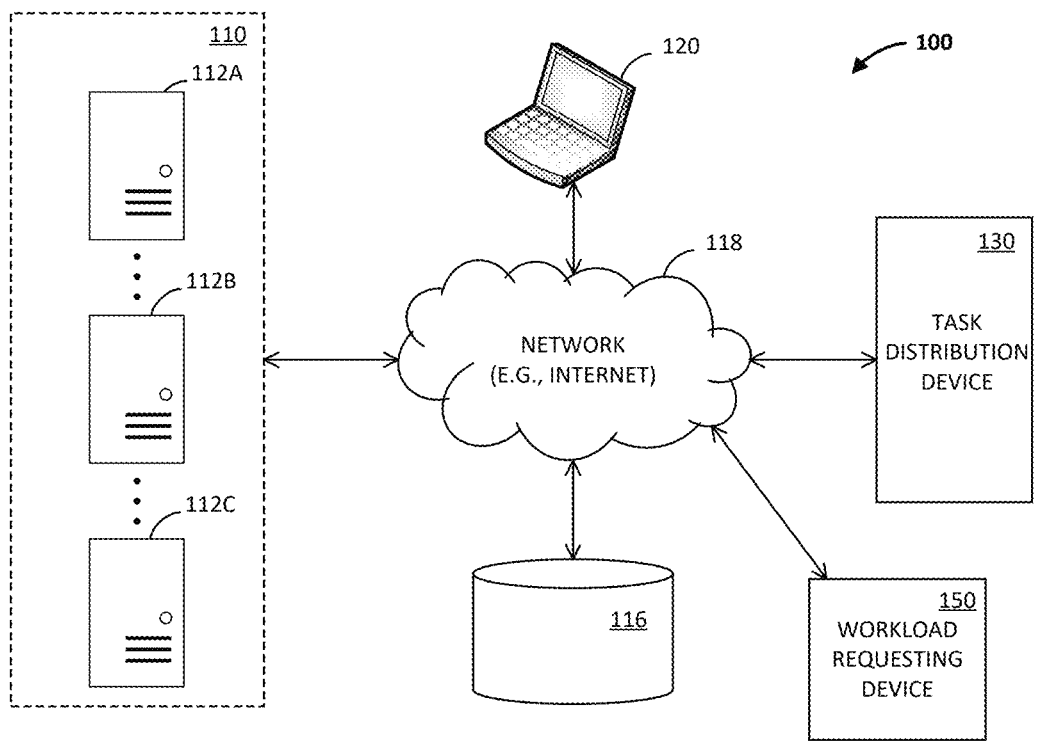
FIG. 1 illustrates an example task distribution computing system, in accordance with some embodiments.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices may be shown in block diagram form in order to avoid unnecessarily obscuring the example embodiment(s).

1. General Overview

Apparatus and corresponding methods for distributing tasks across various processing devices, such as servers, of a distributed computing environment are disclosed. The embodiments can batch workloads and distribute the tasks to the various processing devices for processing such as to reduce an overall processing time. The embodiments may, additionally or alternatively, monitor actual processing times, and reassign tasks that fail to complete within an expected time frame.

In some embodiments, task distribution computing device is programmed to receive workloads for execution. For instance, the task distribution computing device may receive a request for processing a set of workloads for processing from a client device needing execution of all or parts of a real-time application. Each workload can consist of one or more calculation workload units, for instance, where each calculation workload unit represents at least a minimum portion of the workload that can be executed. Further, the task distribution computing device is programmed to apply a trained machine learning process to features of the workloads to generate corresponding task weight values charactering an amount of time each of the workloads is expected to take to complete. The task distribution computing device can batch (e.g., group) the workloads based on the task weight values, and can transmit the batched workloads to various devices of the distributed computing environment for processing. For example, the task distribution computing device can group the workloads into tasks such that each of the tasks have a total task weight value (e.g., sum of the individual task weight values) that is within a particular range. The task distribution computing device can then transmit each of the tasks to a corresponding server (e.g., cloud-based server, hypervisor executing on a server).

In some embodiments, the task distribution computing device generates the task weight values based on the application of a machine learning process to a training dataset. The training dataset can include, for each of a plurality of workloads as executed tasks, an amount of processing time the workload took to complete, and one or more features of the workload. The types of features can include, for example, categorical features, and numerical features. While a categorical feature can include a value characterizing a category (e.g., "risky," "not risky"), a numerical feature can include a value characterizing an amount. The task distribution computing device can input the training dataset to a machine learning model and, based on the inputted training dataset, the machine learning model can generate output data characterizing the task weight values. The training allows the machine learning model to adjust (e.g., learn) weight parameters associated with the various types of features.

For instance, the task distribution computing device can train a machine learning model using an objective function based on a training dataset. The machine learning model can output, during the training, output data characterizing a task weight value related to an amount of time it takes to perform the specific workload. The objective function assumes a linear relationship between the task weight values and the corresponding processing or processing times. In some embodiments, the objective function includes at least one of a first hyperparameter for controlling a number of tasks to be performed (e.g., in a distributed computing environment)

and a second parameter indicating a relationship between task weights and an amount of expected time it takes to execute the workloads. For instance, in some embodiments, the objective function includes the first hyperparameter and the second parameter.

In some embodiments, the task distribution computing device is programmed to label tasks, and monitor the tasks based on their corresponding labels. For instance, the task distribution computing device can determine a processing time for the task based on the task's label. The task distribution computing device can generate historical reports characterizing task execution times based on the monitoring, and can reassign a task if completion of its execution takes longer than a particular amount of time.

The embodiments can provide various technical benefits. For instance, the embodiments leverage machine learning based processes to batch workloads (or sub-workloads, e.g., calculation workload units) to more evenly distribute the batched workloads as tasks across devices of a distributed computing environment. As a result, the embodiments can reduce the chances that a task (e.g., longtails), or batch of workloads, take longer to complete (e.g., execute) than expected. Further, the embodiments can batch the workloads such that task distribution overheads (e.g., distribution processing cost, distribution processing time) are reduced. The embodiments can, additionally or alternatively, reduce distributed task runtimes, the number of distributed tasks, and overall processing costs of a distributed computing system.

2. Example Computing Environments

FIG. 1 illustrates a distributed computing environment 100 that includes a task distribution device 130, a database 116, multiple task processing devices 112A, 112B, 112C, a workload requesting device 150, and a user device 120 communicatively coupled over a network 118 using one or more wired and/or wireless connections. Each of the task distribution device 130, multiple task processing devices 112A, 112B, 112C, and workload requesting device 150, and user device 120 can be, for example, a server, a laptop, a desktop computer, a tablet computer, or any other suitable computing device programmed to carry out the corresponding functions described herein. In addition, the database 116 can be any suitable storage device (e.g., a network drive, cloud storage, etc.).

The network 118 may be implemented by any medium or mechanism that provides for the exchange of data between the various components of FIG. 1. Examples of the network 118 include, without limitation, one or more of a cellular network, a WiFi network, a near-field communication (NFC) network, a Local Area Network (LAN), a Wide Area Network (WAN), any Internet capable network, or any other suitable wired or wireless communication network.

The task distribution device 130 is configured (i.e., programmed) to receive workload requests from various computing devices, such as from the workload requesting device 150. Each workload request can identify (e.g., include) one or more workloads needing execution. The task distribution device 130 is configured to batch the workloads into one or more tasks for execution based on machine learning processes, as described herein.

Further, the task distribution device 130 is configured to transmit each task to a task processing device 112A, 112B, 112C for processing. For example, the task processing devices 112A, 112B, 112C can be part of a cloud 110 that offers cloud computing services. Each of the task processing devices 112A, 112B, 112C can execute one or more hypervisors, for instance. The task distribution device 130 can be configured to transmit one or more tasks to the task processing devices 112A, 112B, 112C for processing. For instance, the task distribution device 130 can be configured to transmit a first task to the task processing device 112A, a second task to the task processing device 112B, and a third task to the task processing device 112C. Each of the first task, second task, and third task can be associated with a corresponding task weight value that is within a same predetermined range and, as such, each of the first task, second task, and third task can be expected to take a similar amount of time to execute.

In some embodiments, the task distribution device 130 can be configured to attach a label to each of the tasks prior to transmitting the tasks to the cloud 110 for execution. The label can include, for example, a report identifier that identifies a report associated with one or more various workloads (e.g., a report identifier may identify a report that requires the execution of multiple workloads based on information contained in the report), a task identifier associated with a particular type of task, or one or more of these or other identifiers. Based on the attached label, the task distribution device 130 can be configured to monitor each task. For example, the task distribution device 130 can be configured to determine a processing time for each task based on the label. In addition, the task distribution device 130 can be configured to generate historical reports that include statistics (e.g., how much processing time has the task needed over a previous temporal interval) based on the task's label. Further still, the task distribution device 130 can be configured to determine when a task is taking longer than expected to execute based on the label, and can be configured to cause the task to terminate and/or be reassign to another task processing device 112A, 112B, 112C.

3. Functional Descriptions

As described further herein, to batch workloads (e.g., calculation workloads) received from the workload requesting device 150, in some embodiments the task distribution device 130 can be configured to apply a trained machine learning process to at least portions of each workload to generate a weight value for the corresponding workload request. For instance, the task distribution device 130 can be programmed to determine features for each of the workloads, and input the features to a trained machine learning model to generate a corresponding task weight value.

In some embodiments, the trained machine learning model determines the task weight values according to the following task weight formula:

$$y_k = \Sigma_{i=1}^{C_k} w_a(w_b v_b) + c$$

where:
$y_k$ is the task weight value (weight value of a workload if it is to be distributed as a task),
$C_k$ is the number of calculation workload units in workload k,
$w_a$ is the weight of a categorical feature a,
$w_b$ is the weight of a numerical feature b,
$v_b$ is the numeric value of feature b, and
c is a constant.

The above task weight formula defines the task weight value, $y_k$, to be the sum of the weights over calculation workload units, where for each calculation workload unit, the numerical feature value for a priceable (e.g., product price) is weighted by its numerical feature weight ($w_b$) and a corresponding categorical feature weight ($w_a$) for a corresponding risk measure as a categorical feature, as described herein. The constant c allows for an offset, as the task weight value may not be directly proportional to the workload's processing or execution time ("workload time").

Based on the task weight values, the task distribution device 130 can batch the workloads into one or more tasks for execution. For instance, in some embodiments, the task distribution device 130 can be programmed to batch the workloads into tasks such that each task is associated with an overall task weight value that is within a predetermined range. The overall task weight value may be determined based on the task weight value of each workload request. For instance, the task distribution device 130 can be configured to add workloads (e.g., workloads received in various requests) to a task until the corresponding task weights values add up to an overall task weight value that is within the predetermined range. By ensuring that each task (or group of workloads) is associated with an overall task weight value in the same predetermined range, the task distribution device 130 tends to even out the required processing times of each task.

In some embodiments, the task distribution device 130 is configured to train the machine learning model based on a training data set that includes, for each of a plurality of workloads, an amount of processing time the workload took to complete, and one or more features of the workload. The machine learning model is trained to generate a weight parameter associated with each feature. The training allows the machine learning model to adjust (e.g., learn) weight parameters associated with various types of workload features. For instance, the weight parameters can include at least a first weight $w_a$ associated with a type of categorical feature, and at least a second weight $w_b$ associated with a type of numerical feature. As the machine learning model is trained, the weight parameters are learned.

The machine learning process also includes the use of an objective function during the training. In some embodiments, the above objective function assumes a linear relationship between task weight values and corresponding workload times. For example, the objective function can be defined by the following formula:

$$\min \frac{1}{n} \left( \sum_{k=1}^{n} |t_k - \alpha y_k| + \frac{\beta}{M_{tw}} \sum_{k=1}^{n} y_k \right)$$

where:
n is the number of workloads,
$t_k$ is the workload time,
$y_k$ is the task weight value according to the weight formula,
$M_{tw}$ is the maximum task weight (e.g., 8000),
$\alpha$ is a weight-time scale factor characterizing a ratio between task weight values and workload times, and
$\beta$ is the stress factor for the number of tasks that acts as a penalty factor to prevent the model from generating extremely large weight values, thereby allowing for a smaller number of tasks.

The objective function can be used to minimize an average running time of tasks executed simultaneously in a distributed computing environment. In some embodiments, the task distribution device 130 can be configured to use a Sequential Least Squares Programming (SLSQP) algorithm or other known optimization techniques to optimize the objective function. The SLSQP algorithm can be selected because it can use second order information to reach an optimal point at a faster rate than other optimization algorithms such as, for example, gradient descent.

In some embodiments, the objective function is constrained by a hyperparameter (e.g., $\beta$) controlling a number of tasks to be executed. For instance, adjusting the hyperparameter in one direction (e.g., increasing the hyperparameter) may cause the objective function to compute lower task weight values, which when applied in the execution phase tend to reduce the number of tasks and be more accepting of higher task execution times, whereas adjusting the hyperparameter in an opposite direction (e.g., decreasing the hyperparameter) may tend to increase the number of tasks and be less accepting of the higher task execution times. Additionally or alternatively, the objective function can be constrained by a parameter (e.g., $\alpha$) that characterizes a relationship, e.g., ratio, between the task weights and an amount of expected time it takes to execute the workloads. For example, the parameter may initially be set as a target average task processing time divided by a maximum task weight allowed.

In some embodiments, the task distribution device 130 can be configured to train the machine learning model, by minimizing the objective function, with one or more training data sets. The task distribution device 130 can be configured to then validate the machine learning model using a new or unused validation data set, where the validation data set includes workload features for a plurality of workloads. The task distribution device 130 can be configured to input the workload features into the initially trained machine learning model and, based on the inputted workload features, the machine learning model may output task weight values. Further, the task distribution device 130 may determine whether the machine learning model is sufficiently trained based on the task weight values generated during the validation.

For example, the task distribution device 130 can be configured to receive a new report that is associated with a workload of various calculation workload units. For each workload feature, the task distribution device 130 can assign an initially learned weight value. The task distribution device 130 can also be configured to generate a task weight value based on the assigned weight values. Further, the task distribution device 130 can be configured to determine if the machine learning model is sufficiently trained based on the generated task weight values. For instance, based on the task weight values, the task distribution device 130 can be configured to determine one or more metrics, such as a maximum distributed task runtime, a number of distributed tasks, and a total grid cost. The maximum distributed task runtime is the runtime for the generated task that would take longest to execute. The number of distributed tasks is the number of tasks determined for distribution. Further, the total grid cost represents the cost associated with providing, and executing, the generated tasks.

In some embodiments, when each of the above metrics are below a corresponding threshold, the task distribution device 130 is configured to determine the machine learning model is validated. When, however, one or more of the metrics are at or above their corresponding threshold, the workload associated with the new report can be added to the training dataset for retraining the machine learning model. For example, the task distribution device 130 can be configured to re-train the machine learning model using the workload associated with the new report (e.g., iterative training). If the task distribution device 130 determines the machine learning model is sufficiently trained, the task distribution device 130 may store the learned parameters, including the weights associated with the various feature types, in database 116. The task distribution device 130 may further store the final hyperparameters of the objective function in the database 116.

In some embodiments, the task distribution device 130 is configured to train an artificial neural network (ANN) based on a training dataset that includes workload features and corresponding execution times. For instance, the task distribution device 130 can be configured to input the workload features and corresponding execution times to the ANN. The training causes the ANN to adjust learning parameters associated with the workload features. In some embodiments, the task distribution device 130 is configured to validate the ANN based on a new validation dataset. For instance, the task distribution device 130 can be configured to generate estimated execution times based on the learned parameters and the new validation dataset. Further, the task distribution device 130 can be configured to determine one or more metrics based on the estimated execution times, and determine whether the ANN is sufficiently trained based on the one or more metrics, as described herein. Once trained, the task distribution device 130 can be configured to store the learned parameters in a database, such as database 116.

Figure 2:
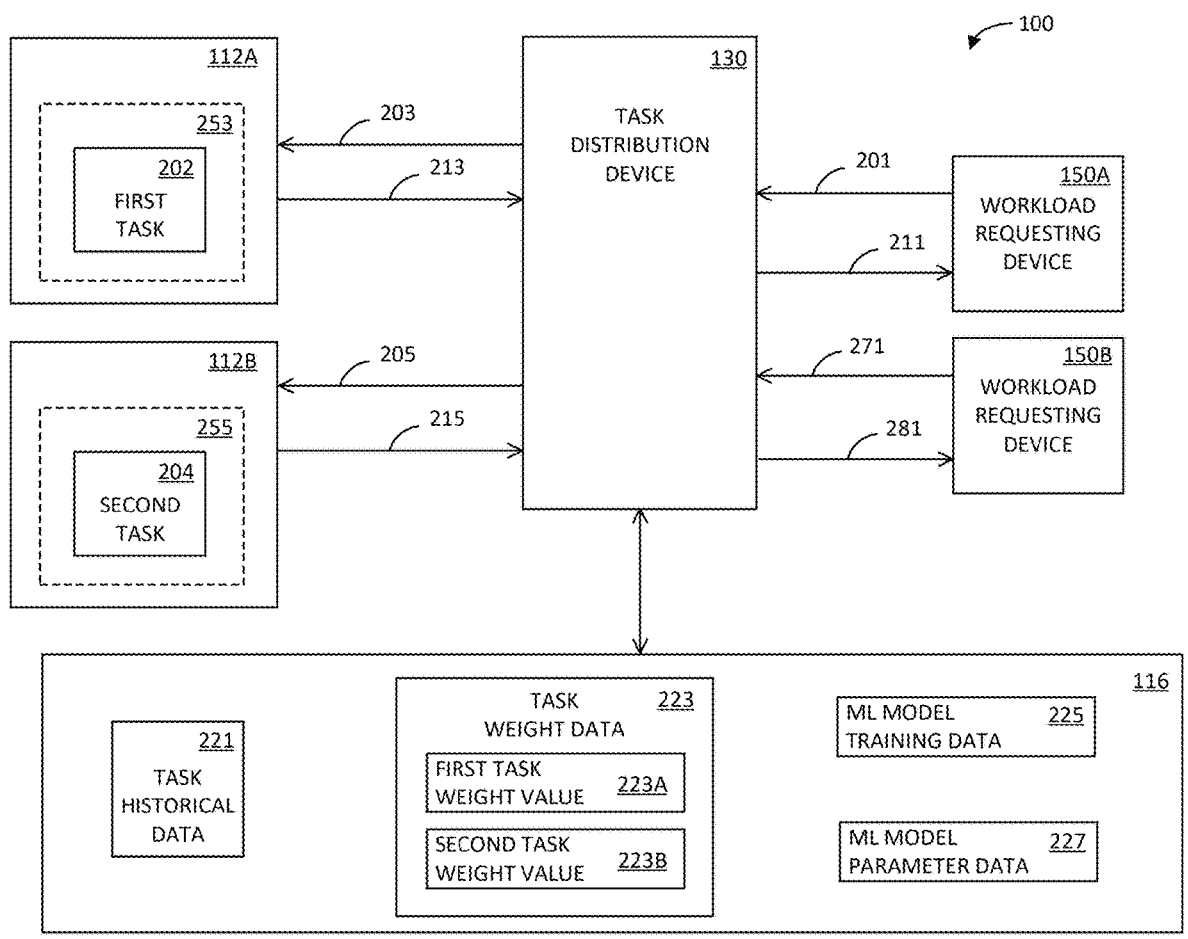
FIG. 2 illustrates example operations of the task distribution computing system of FIG. 1, in accordance with some embodiments.

FIG. 2 illustrates example operations of the distributed computing environment 100. For instance, task distribution device 130 may receive a first workload request 201 from a first workload requesting device 150A. The first workload request 201 may identify one or more workload needing execution. Similarly, the task distribution device 130 may receive a second workload request 271 from a second workload requesting device 150B, where the second workload request 271 identifies one or more workloads needing execution. Each of the received workloads include corresponding feature values.

For each workload request, the task distribution device 130 may execute a trained machine learning model to compute a task weight value. For instance, the task distribution device 130 may obtain machine learning model parameter data 227 from the database 116. The machine learning model parameter data 227 may include parameters, such as weight parameters, characterizing the trained machine learning model. Based on the machine learning model parameter data 227, the task distribution device 130 may execute the trained machine learning model.

In some embodiments, to generate the machine learning model parameter data 227, the task distribution device 130 is configured to obtain machine learning model training data 225 from the database 116. The machine learning model training data 225 may include, for each of multiple workloads, one or more feature values of the workload, and an amount of time taken to perform the workload. The task distribution device 130 is configured to train a machine learning model, using an objective function (e.g., using an optimization technique such as SLSQP), based on the machine learning model training data 225, where during the training the machine learning model adjusts weight values that are associated with the various features. Upon determining that the machine learning model is trained (e.g., and validated), the task distribution device 130 is configured to store the parameters (e.g., weights, hyperparameters) as machine learning model parameter data 227 in the database 116.

Referring back to FIG. 2, for each workload received (e.g., via the first workload request 201 and second workload request 271), the task distribution device 130 can be configured to extract feature values, and can generate feature vectors based on the extracted feature values. The task distribution device 130 is also configured to input the feature vectors to the trained machine learning model and, in response, the trained machine learning model outputs a corresponding task weight value. As described herein, the task weight value may be associated with an amount of processing time that the task is expected to take.

In some embodiments, the task distribution device 130 may store the generated task weight value as task weight data 223 within the database 116. For example, the task weight data 223 may include a first task weight 223A for the first task 202, and a second task weight 223B for the second task 204. In some embodiments, the task distribution device 130 is configured to generate a graph (e.g., plots) for display based on the task weight data 223. For instance, a graph may indicate an amount of the generated task weights over a previous temporal interval (e.g., previous week, previous month, previous hour, etc.) that fall within predetermined ranges (e.g., 0 to 0.25, greater than 0.25 to 0.50. greater than 0.50 to 0.75, and greater than 0.75 to 1).

Further, and based on the task weight value, the task distribution device 130 is configured to determine whether to break up the workload associated with a workload request into sub-workloads (e.g., one or more calculation workload unit groups), or to batch the workloads associated with one or more workload requests into one or more tasks. For instance, when the task weight value for a workload is above a predetermined threshold, the task distribution device 130 can be configured to divide the calculation workload units of the workload into calculation workload unit groups, and may batch each of the calculation workload unit groups into a task. In some embodiments, the task distribution device 130 is configured to batch workloads associated with different workload requests based on determining an overall task weight value as each workload is added to a task. For instance, as workloads associated with each workload request is added to a task, the task distribution device 130 can add the workload request's corresponding task weight value to an overall task weight value. If adding the task weight value to the overall task weight value would cause the overall task weight value to be greater than a predetermined threshold, the task distribution device 130 does not add the workloads associated with the workload request to the task, and the task is complete.

The task distribution device 130 can transmit each task for execution in the distributed computing environment 100. For example, the task distribution device 130 can transmit a first task group 203 for execution to a first task processing device 112A. The first task group 203 can include at least a first task 202 to be executed by one or more processors 253 of the first task processing device 112A. The first task 202 can include, for example, one or more workloads received in one or more of the first workload request 201 and the second workload request 271. When the first task processing device 112A has completed processing of the first task group 203, the first task processing device 112A may generate a first task group completion response 213 indicating that execution of the first task group 203 is complete, and may transmit the first task group completion response 213 to the task distribution device 130.

Similarly, the task distribution device 130 may transmit a second task group 205 for execution to a second task processing device 112B. The second task group 205 may include at least a second task 204 that may be executed by one or more processors 255 of the second task processing device 112B. The second task 204 may be, for example, a task, or a portion of a task, received in either the first workload request 201 or second workload request 271.

When the second task processing device 112B has completed processing of the second task group 205, the second task processing device 112B may generate a second task group completion response 215 indicating that execution of the second task group 205 is complete, and may transmit the second task group completion response 215 to the task distribution device 130.

Based on receiving one or more of the first task group completion response 213 and the second task group completion response 215, the task distribution device 130 is configured to generate a first workload request response 211 message characterizing completion of the workload execution request received in the first workload request 201. For example, the task distribution device 130 may generate the first workload request response 211 when one or more of the first task group completion response 213 and the second task group completion response 215 confirm that all of the tasks requested to be executed in the first workload request 201 are complete. The task distribution device 130 is configured to transmit the first workload request response 211 to the first workload requesting device 150A.

Similarly, the task distribution device 130 can generate a second workload request response 281 message characterizing completion of the workload execution request received in the second workload request 271. For example, the task distribution device 130 can generate the second workload request response 281 when one or more of the first task group completion response 213 and the second task group completion response 215 confirm that all of the tasks requested to be executed in the second workload request 271 are complete. The task distribution device 130 can transmit the second task workload response 281 to the second workload requesting device 150B.

In some embodiments, prior to transmitting the first task group 203 or the second task group 205, the task distribution device 130 is configured to label each task of the corresponding task group. For instance, the task distribution device 130 can store, within a field of configuration data (e.g., metadata) for the task, an identification value that serves to identify the task. The identification value can be based on a type of the task, for example. The task distribution device 130 can be configured to then transmit the first task group 203 or the second task group 205, which include the labelled tasks, for execution. When the corresponding tasks are complete, the first task processing device 112A can generate the first task group completion response 213 to include the identification value of each of the tasks, and can transmit the first task group completion response 213 to the task distribution device 130. Similarly, when the corresponding tasks are complete, the second task processing device 112B can generate the second task group completion response 215 to include the identification value of each of the tasks, and can transmit the second task group completion response 215 to the task distribution device 130.

Based on the identification values received, the task distribution device 130 can be configured to determine an amount of time each of the tasks needed for completion. For instance, the task distribution device 130 can compare a time from when the task was transmitted for execution to a time when a corresponding task group completion response is received, and determine the amount of time a task needed for completion based on the comparison. Moreover, if a completion response for a task with a particular identification value has not been received within a predetermined amount of time, the task distribution device 130 can be configured to perform operations to terminate the task and/or reassign the task to another task processing device 112.

For instance, in some embodiments, for each identification value, the task distribution device 130 can be configured to compute an aggregate amount of time that tasks associated with the identification value have taken to complete (e.g., an average or median amount of time over a prior temporal interval, such as a month, a week, a year, an hour, etc.) based on the task historical data 221 (e.g., for a same type of task, such as tasks associated with the same task identification value). When a task associated with the identification value and assigned for execution does not complete by the aggregate amount of time (and, in some examples, plus a buffer or tolerance period (e.g., 50% of the aggregate amount of time)), the task distribution device 130 can be configured to perform operations to terminate the task, and to reassign the task to another task processing device 112. In the absence of historical data, the task distribution device 130 can be configured to utilize the estimated total weight obtained from executing the machine learning model discussed above on features of a given task and the current weight-time scale factor (a) to estimate the amount of time it would take for the given task to compete. The task distribution device 130 can be programmed to then use the estimated amount of time in place of the aggregate amount of time to determine whether execution of the given task has stalled.

Further, the task distribution device 130 can be configured to generate task historical data 221 for each task processed for execution, and can store the task historical data 221 in the database 116. The task historical data 221 can include the task identification values and, for each identification value, the amount of time each task has taken to completion (e.g., an average value for each type of task). The task historical data 221 can also include a running average, for each task type (e.g., based on task identification values), of how long each task type has taken to execute. The task historical data 221 can further include task failure data indicating whether a task has failed to complete (e.g., a running count for each type of task).

In some embodiments, the task distribution device 130 is configured to detect stalling tasks based on applying an algorithm to data extracted from task historical data 221. The executed algorithm can compute an expected aggregate execution time for the task, such as the maximum execution time. Once a stalled task is detected, in some embodiments, the task distribution device 130 is configured to kill (e.g., stop) the problematic engine (e.g., processor, compute unit, etc.) running the task, and in some embodiments is configured to assign the killed task to another engine.

4. Example Processes

Figure 3:
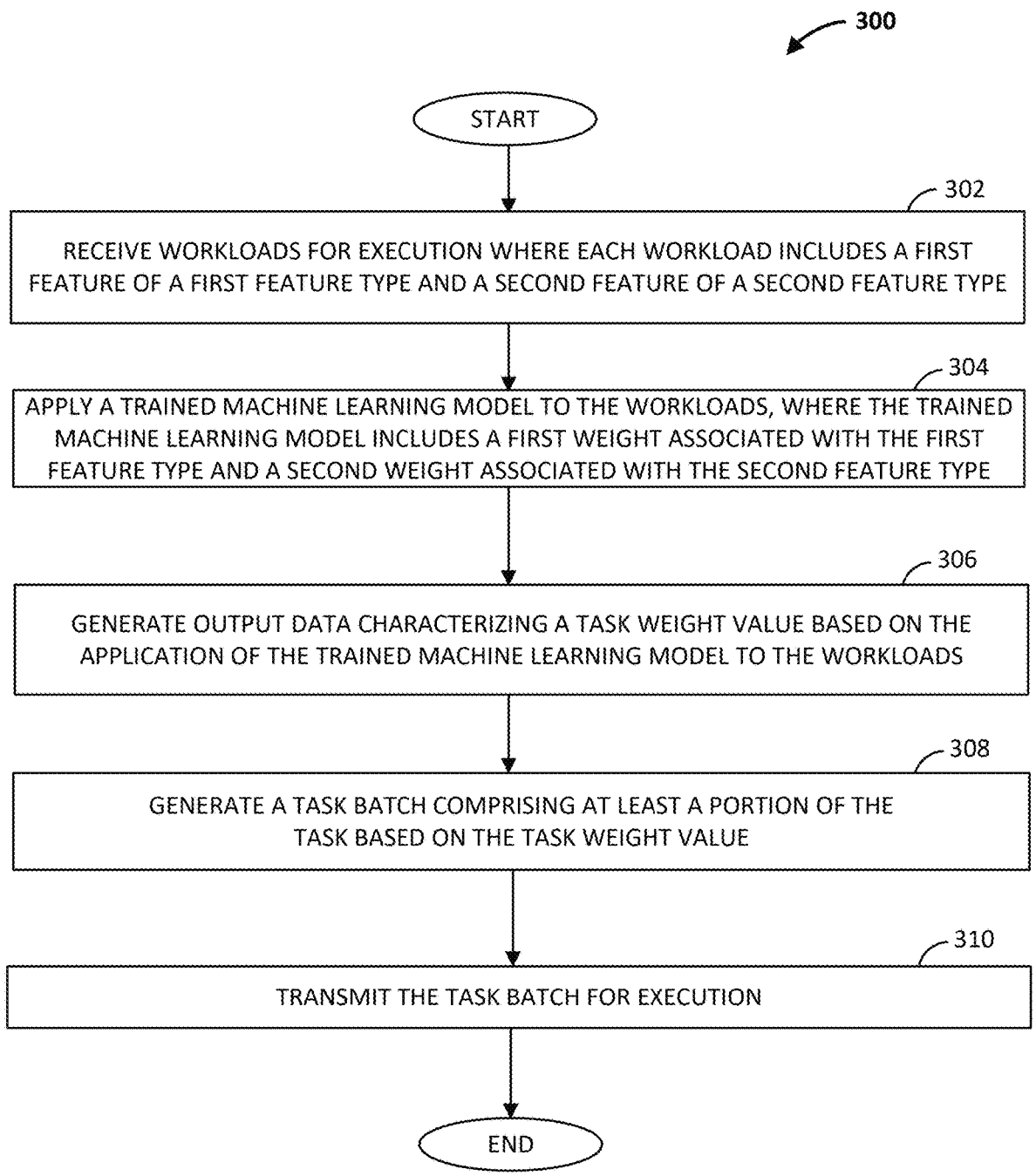
FIG. 3 illustrates an example task distribution process, in accordance with some embodiments.

FIG. 3 illustrates an example task distribution process 300. The task distribution process 300 may be carried out by, for example, the task distribution device 130. FIG. 3 is shown in simplified, schematic format for purposes of illustrating a clear example and other embodiments may include more, fewer, or different elements connected in various manners. FIG. 3 is intended to disclose an algorithm, plan, or outline that can be used to implement one or more computer programs or other software elements which, when executed, can cause the performing of one or more of the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

At block 302, a first workload request is received. The first workload request includes one or more workloads where each workload includes at least a first feature of a first feature type and a second feature of a second feature type. For example, a workload can include a type of categorical feature and a type of a numerical feature. At block 304, a trained machine learning model is applied to the workloads. The trained machine learning model includes at least a first weight associated with the first feature type and a second weight associated with the second feature type. For example, as described herein, the first weight can be associated with the type of categorical feature, and the second weight can be associated with the type of numerical feature. The task features, including the first feature of the first feature type and the second feature of the second feature type, are inputted to the trained machine learning model.

In some embodiments, to train the machine learning model, training data is received. The training data includes a plurality of training workloads and, for each of the plurality of training workloads, a time value characterizing an amount of execution time. The machine learning model is trained based on the training data and, the training generates the first weight and the second weight. In some embodiments, at least one of the first weight and the second weight are adjusted based on the training.

In some embodiments, weight values are generated based on the training, where each weight value corresponds to a feature of the workloads. In addition, in some embodiments, a determination is made that the training is complete based on applying the machine learning model to an unused training dataset. For example, a metric can be computed based on applying the machine learning model to the unused training dataset. The metric can be, for example, a maximum distributed task runtime, a number of distributed tasks, and a total grid cost. The training is complete when the metric is beyond (e.g., above, below) a predetermined threshold.

In some embodiments, an objective function that describes the relationship between the execution times and the task weights of workloads and includes a penalty for large task weights is minimized during the training. Based on the application of the objective function to the task weight values and the time values, a determination is made of a linear relationship between the task weight values and the time values. The training may be determined to be complete when the best linear relationship has been determined. In some embodiments, the first weight and the second weight are adjusted to conform the task weight values to the linear relationship that best characterizes the training dataset.

In some embodiments, the objective function includes at least a hyperparameter (e.g., β) for controlling a number of tasks to be executed and a parameter (e.g., α) that characterizes a relationship, e.g., ratio, between the task weights and an amount of expected time it takes to execute the workloads. The objective function can additionally include a maximum task weight (e.g., $M_{rw}$) that defines a maximum weight value for a task weight. For instance, if a task weight value generated for a workload meets or exceeds the maximum weight value, the workload is not batched with other workloads.

Referring back to FIG. 3, at block 306, output data is generated based on the application of the trained machine learning model to the workloads. The output data characterizes a task weight value that is associated with an amount of time the task may take to execute. Proceeding to block 308, a task is generated based on the task weight values computed for the workloads. The task includes at least a portion of the workloads. For example, the task can include all of the workloads received in the request, or at least a portion of the workloads received in the request and, in some embodiments, at least a portion of one or more other workloads received in another workload request. In some embodiments as described herein, the task is associated with an overall task weight value that is within a predetermined range (e.g., above zero and below a maximum threshold). Further, at block 310, the task batch is transmitted for execution.

In some embodiments, an overall task weight value for the task is determined based on the generated task weight values. For instance, the overall weight value can be the sum of the task weight values generated for the workload requests that have been added to the task. In some embodiments, the overall task weight value is determined to be within a predetermined range. Based on the determination, the task is transmitted for execution.

In some embodiments, a second workload request is received. The trained machine learning model is applied to the workloads of the second workload request and, based on the application of the trained machine learning model to the workloads of the second workload request, a second task weight value is generated. In some embodiments, the task is generated based on the second task weight value, where the task includes the workloads associated with the first workload request and at least a first portion of the workloads associated with the second workload request. In addition, a second task is generated. The second task includes at least a second portion of workloads associated with the second workload request. The first task can be transmitted to a first server (e.g., first task processing device 112A), and the second task batch can be transmitted to a second server (e.g., second task processing device 112B).

Figure 4:
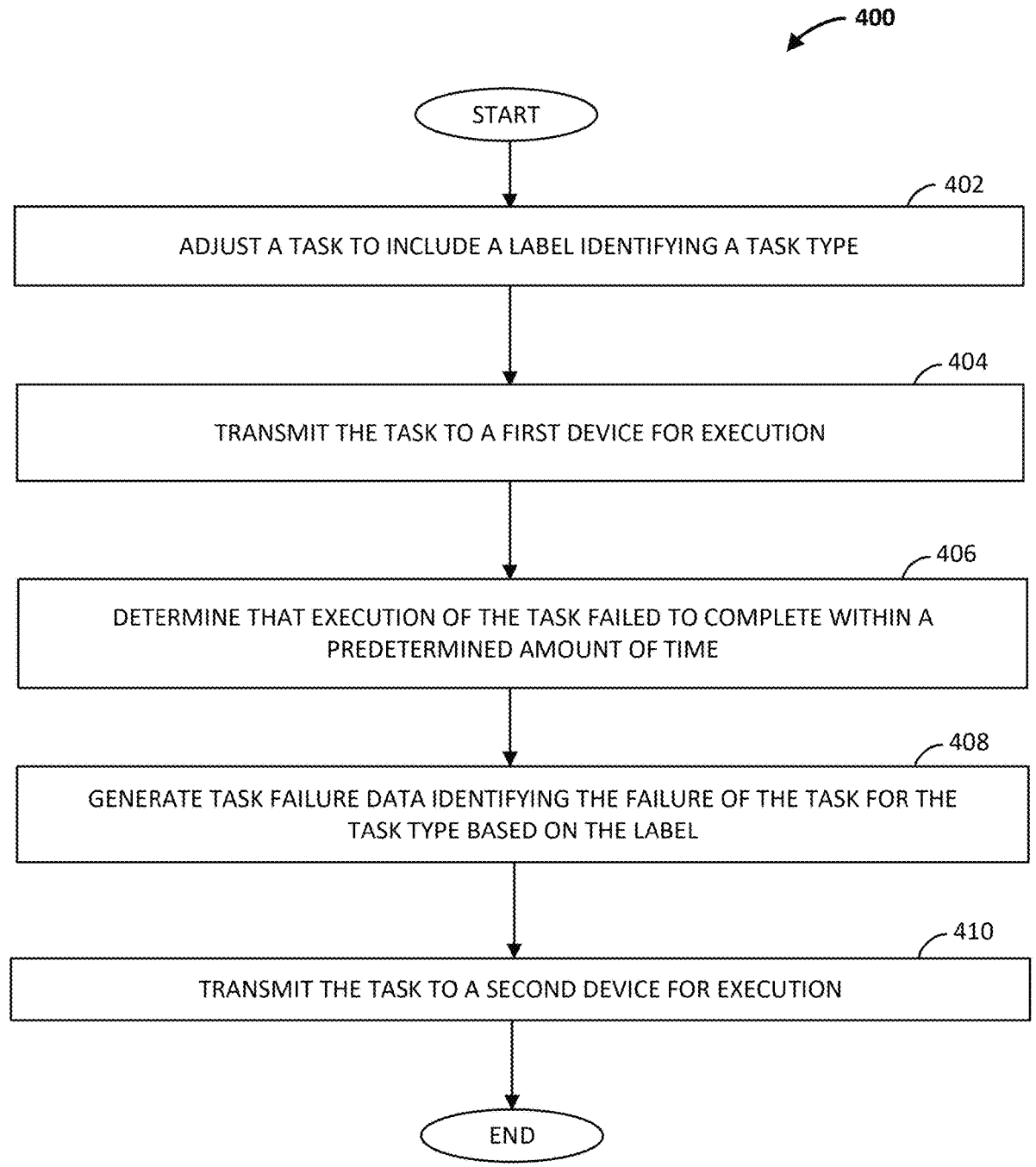
FIG. 4 illustrates an example task failure detection process, in accordance with some embodiments.

FIG. 4 illustrates an example task failure detection process, in accordance with some embodiments. FIG. 4 is shown in simplified, schematic format for purposes of illustrating a clear example and other embodiments may include more, fewer, or different elements connected in various manners. FIG. 4 is intended to disclose an algorithm, plan, or outline that can be used to implement one or more computer programs or other software elements which, when executed, can cause the performing of one or more of the functional improvements and technical advances that are described herein.

At block 402, a task is adjusted to include a label identifying a task type of the task. For instance, the label may be an identification value that serves to identify the type of the task. Further, at block 404, the task is transmitted to a first device for execution. At block 406, a determination is made that the execution of the task has failed to complete within a predetermined amount of time. For instance, in some examples, a timer is initiated with the predetermined amount of time. The determination that the execution of the task has failed to complete is made based on expiration of the timer (e.g., based on receiving an interrupt that the timer expired). In other examples, an executing task runtime checker task periodically checks the task runtimes of the various distributed tasks. For instance the executing task runtime checker task may determine the runtime of a distributed task every few minutes (e.g., 1, 2, 10 minutes) until the task is complete, or until a maximum amount of runtime has been reached. In some embodiments, the predetermined amount of time is proportional to an aggregate expected time for the type of the task computed from historical task execution data based on such labels.

In some embodiments, and as described herein, an algorithm may be applied to task historical data, such as task historical data 221, to determine an aggregate expected time that the type of the task is expected to take. A determination may be made that the task has failed to complete within the aggregate expected time.

Further, at block 408, task failure data is generated based on the label. The task failure data identifies the failure of the task for the task and the type of the task. In some embodiments, the task failure data is stored within a database, such as within the task historical data 221 of database 116.

At block 410, the task is transmitted to a second device for execution. For instance, assuming the task was originally transmitted to task processing device 112A for execution, the task distribution device 130 may transmit a message to task processing device 112A to have the task stopped. The task distribution device 130 may then transmit the task to task processing device 112B (e.g., within a second task group 205) to reassign the task for execution. The task distribution device 130 can also be programmed to send a notification of the stall or relevant diagnostic data to another device to further investigate the reason for the stall before determining whether to rerun or reassign the task.

Figure 5:
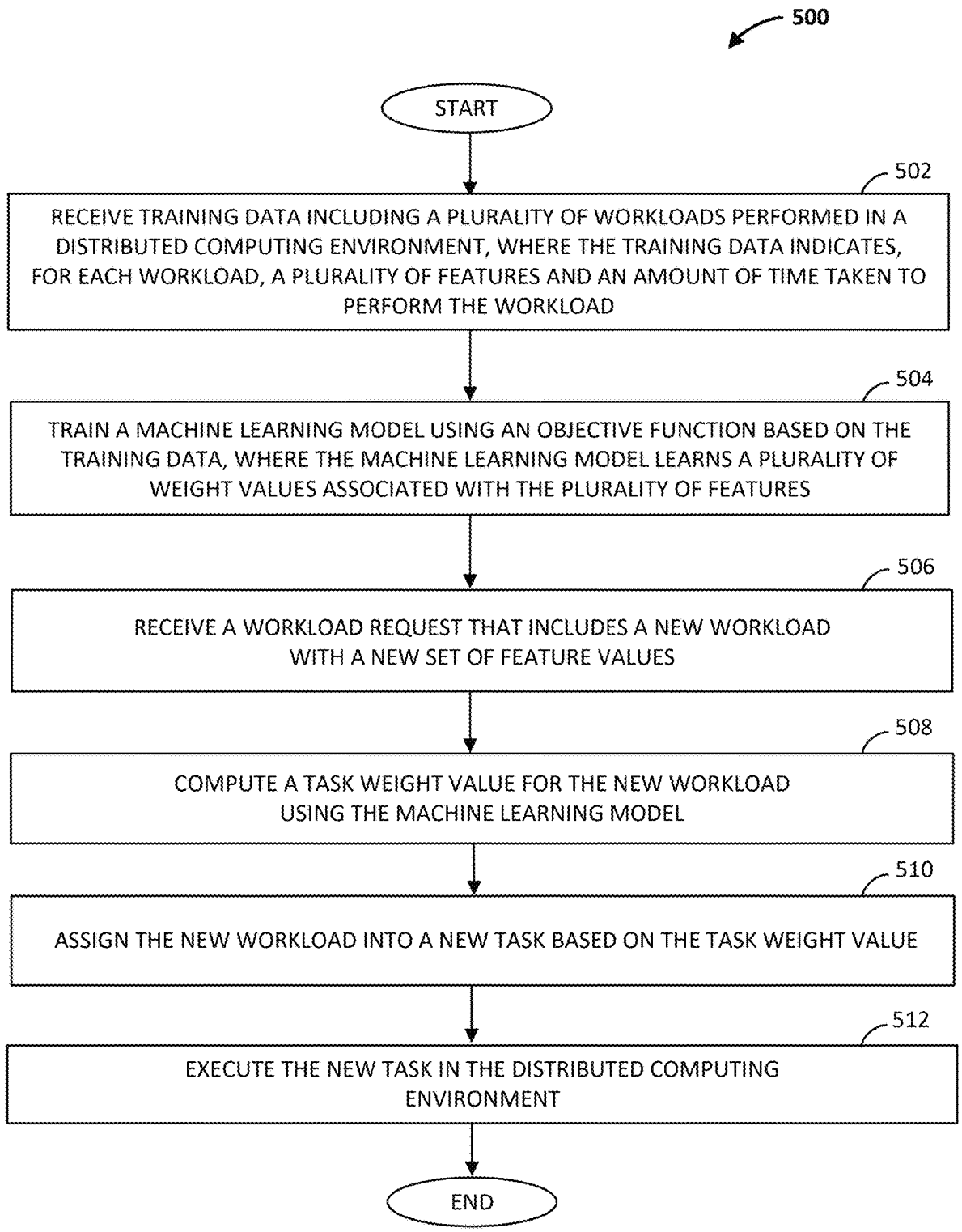
FIG. 5 illustrates an example process to efficiently execute tasks in a distributed computing environment, in accordance with some embodiments.

FIG. 5 illustrates a process to efficiently execute tasks in a distributed computing environment, in accordance with some embodiments. FIG. 5 is shown in simplified, schematic format for purposes of illustrating a clear example and other embodiments may include more, fewer, or different elements connected in various manners. FIG. 5 is intended to disclose an algorithm, plan, or outline that can be used to implement one or more computer programs or other software elements which, when executed, can cause the performing of one or more of the functional improvements and technical advances that are described herein.

Beginning at block 502, training data is received. The training data includes a plurality of workloads performed in a distributed computing environment, and indicates, for each workload, a plurality of features and an amount of time taken to perform the workload. Further, at block 504, a machine learning model is trained using an objective function based on the training data. As described herein, the machine learning model may include a plurality of weights associated with the plurality of features of the workloads, where values for the plurality of weights are learned during the training. During the training, the machine learning model adjusts the plurality of weights so as to reduce a total amount of time it takes to perform tasks in the distributed environment. The plurality of weights for the features of a workload can form a linear relationship with a task (total) weight for the workload. In some embodiments, the objective function can include a first hyperparameter (e.g., $\beta$) to control a number of tasks to be performed in the distributed computing environment. Additionally or alternatively, In some embodiments, the objective function can include a parameter (e.g., $\alpha$) that indicates a relationship between a weight assigned to a certain workload and the amount of time it takes to execute the workload. The training can be performed by optimizing the objective function.

Proceeding to block 506, a new workload request is received. The new workload request includes a new workload with a new set of feature values. For instance, the new workload may include a categorical feature and a numerical feature that was not present in the training data. Further, at block 508, a task weight value for the new workload is computed using the machine learning model. As described herein, the task weight value may be associated with an expected amount of time the new workload is expected to take to execute.

At block 510, the new workload is assigned to one or more new tasks based on the task weight value. For example, as described herein, the new workload may be batched with other workloads to form the new task for execution. The new workload can also be divided into multiple sub-workloads, each leading to a new task. In some embodiments, the new task is associated with an overall task weight value that is within a predetermined range, such as above zero and below a maximum task weight value.

Further, at block 512, the new task is executed in the distributed computing environment. For example, the new task may be transmitted as part of the first task group 203 to the task processing device 112A for execution.

Figure 6A:
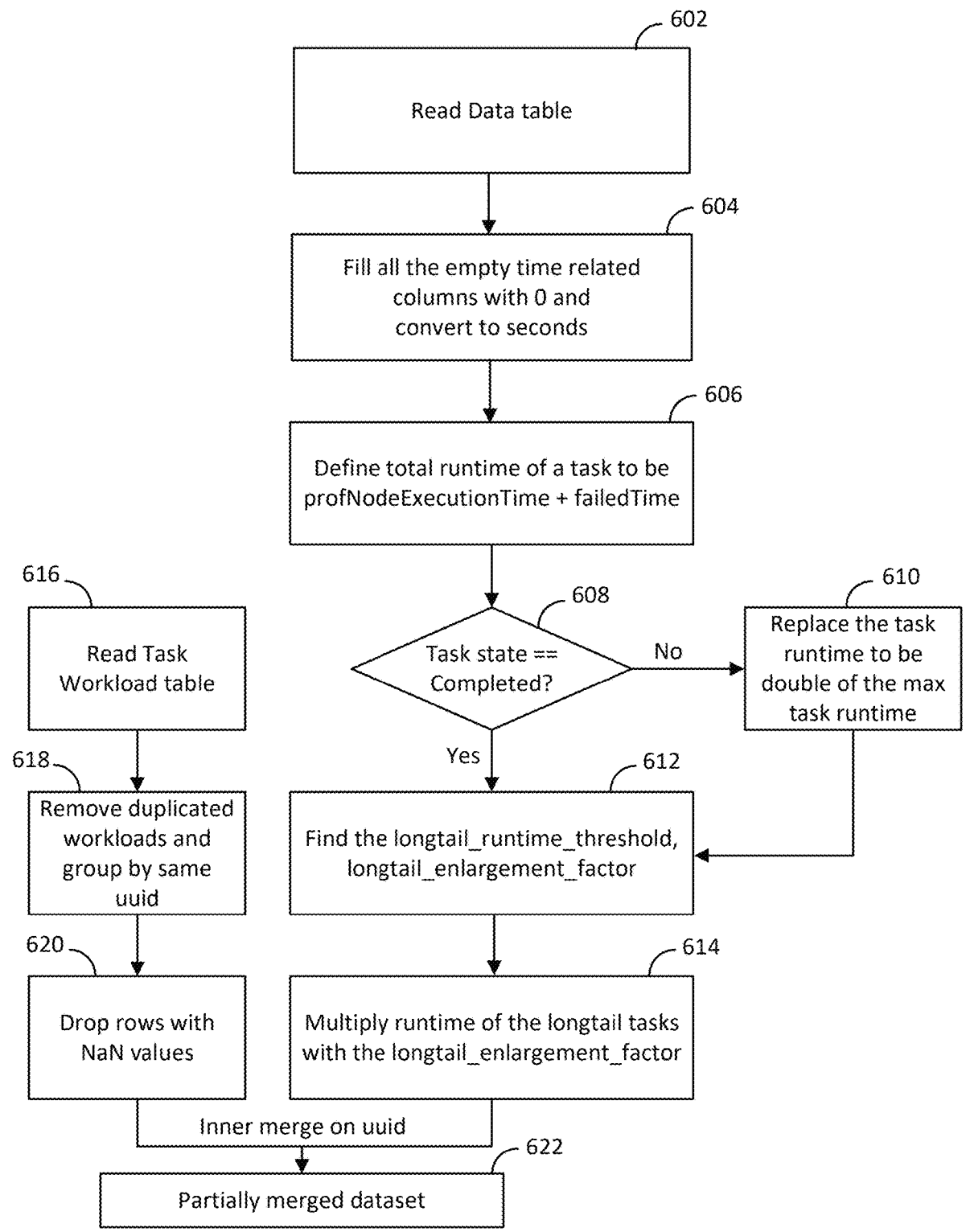
FIG. 6A illustrates steps of an example method to generate training data, in accordance with some embodiments.
Figure 6B:
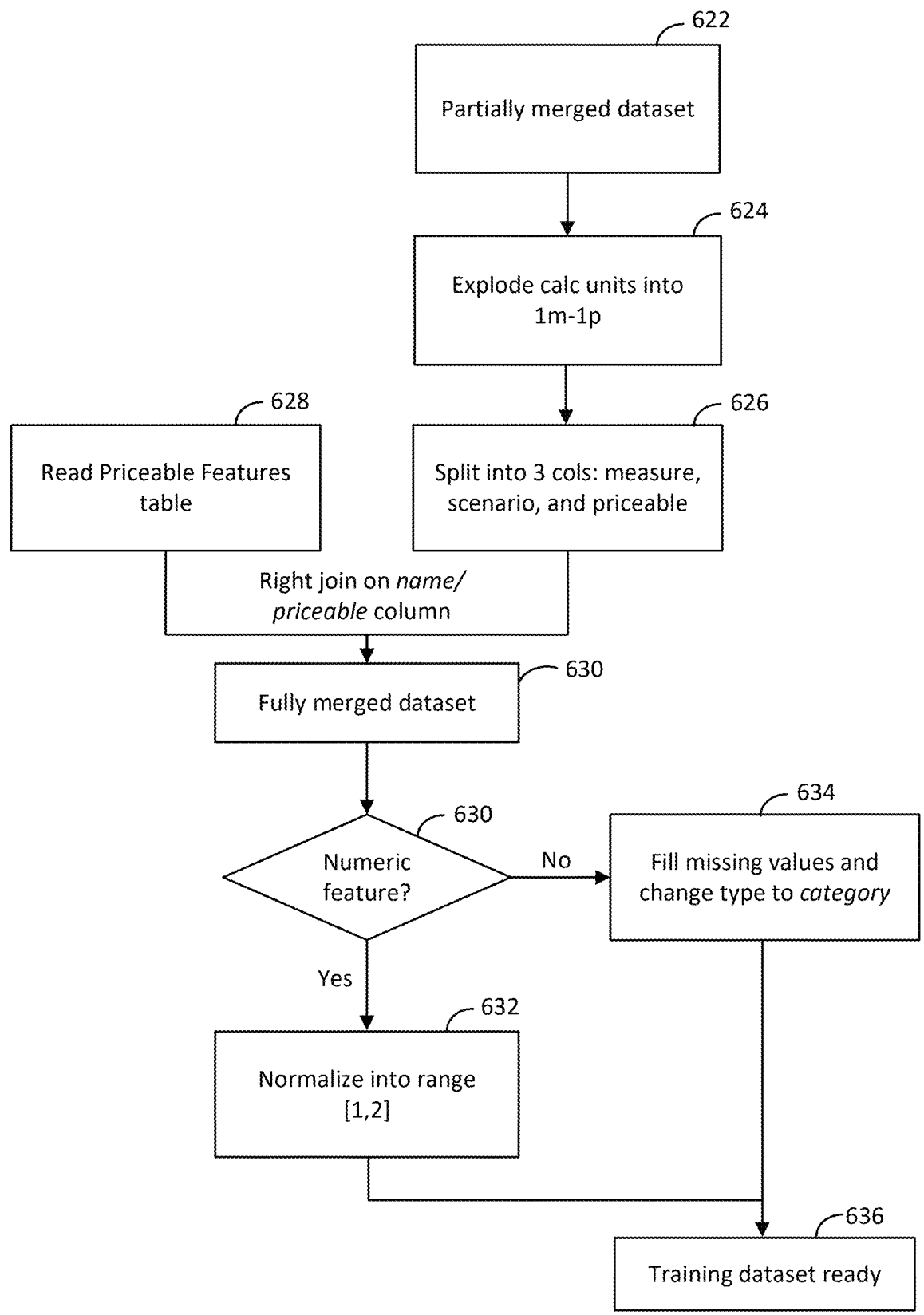
FIG. 6B illustrates additional steps of an example method to generate training data, in accordance with some embodiments.

FIGS. 6A and 6B illustrate example processes to generate training data, in accordance with some embodiments. Each of FIGS. 6A and 6B is shown in simplified, schematic format for purposes of illustrating a clear example and other embodiments may include more, fewer, or different elements connected in various manners. Each of FIGS. 6A and 6B is intended to disclose an algorithm, plan, or outline that can be used to implement one or more computer programs or other software elements which, when executed, can cause the performing of one or more of the functional improvements and technical advances that are described herein.

With reference to FIG. 6A, at block 602, data is read from a table stored in memory. The table may include, for a plurality of tasks, a task id (e.g., uuid), a column defining task execution times, a column defining failed task times, and a column defining the task state. At block 604, any empty time columns of the table are filled in with the value zero. In addition, all times are converted to a specific unit, such as seconds. At block 606, for each task, a total runtime variable is computed to be the sum of the corresponding execution time and the failed time.

When, at block 608, the task state for a task is identified as completed, the process proceeds to block 612. When, however, the task state for the task is not identified as completed, the task process proceeds to block 610, where the task runtime is replaced with a relatively large value, such as twice that of a maximum task runtime. For instance, if the maximum task runtime is defined as 500 milliseconds, the task runtime is adjusted to be 1 second. The method then proceeds to block 612.

At block 612, a longtail_runtime_threshold and longtail_enlargement_factor are read from memory (e.g., from the table stored in memory). The longtail_runtime_threshold defines a runtime threshold over which tasks are considered "longtails" (e.g., tasks that are taking too long to execute), and the longtail_enlargement_factor defines a multiplication factor that may be applied to a task runtime. In some embodiments, the longtail_runtime_threshold and the longtail_enlargement_factor are computed as follows. First, the maximum runtime is determined. A range of values from 0 to the maximum runtime, with a predefined step size of TIME_INTERVAL, are determined. If the last value in the range is less than the maximum runtime, then the maximum runtime is appended to the range. Further, time interval buckets are established where each bucket corresponds to a time interval of maximum runtime divided by the TIME_INTERVAL. In addition, tasks are partitioned into the buckets according to their runtime. For instance, a task runtime of five minutes would be placed into a bucket that includes 5 minutes within its associated range. Further, the number of tasks in each bucket is counted and stored. A bar chart can be generated with the x-axis defining the time ranges and the y-axis defining the computed bucket counts. Further, a downward power trend line y=ax^(-b) is fitted to the graph, where a and b are parameters estimated by the curve fit. The slope of the trend line is computed at each TIME_INTERVAL, and the slopes are normalized (e.g., into a range of 0.0 to 1.0). Tasks are marked as "longtail tasks" if a task runtime is in a bucket where the trendline's slope is greater than a SLOPE_THRESHOLD value. The longtail_runtime_threshold is the runtime for the smallest of the longtail tasks. Further the total runtime of longtail tasks (sum_of_longtail_runtimes) and the non-longtail tasks (sum_of_non_longtail_runtimes) are calculated. The longtail_enlargement_factor is determined to be the larger of the sum_of_non_longtail_runtimes divided by the sum_of_longtail_runtimes, and a maximum value, such as 1.0.

At block 614, for each task, if the runtime for a task is greater than the longtail_runtime_threshold, the runtime for that task is adjusted in the table to be its runtime multiplied by the longtail_enlargement_factor. The method then proceeds to block 622.

At block 616, task workloads are read from a task workload table identifying, for each workload, a task id and one or more feature values. Further, at block 618, duplicated workloads are removed so as to not have redundant workloads, and workloads are grouped based on task ids (e.g., uuids). At block 620, workloads with no feature values are removed from the dataset. The process then proceeds to block 622, where the data from blocks 620 and 614 is merged based on task ids (e.g., uuids) to form a partial training dataset.

Referring now to FIG. 6B, at block 624, each task in the merged dataset that has more than one feature type is split into multiple rows, where each row corresponds to each feature type. For example, each row will include only a first feature type (e.g., a measure) and a second feature type (e.g., a priceable). In addition, at block 626, each task column is split into various columns that include the first feature type (e.g., a measure), the second feature type (e.g., a priceable), and a third feature type (e.g., scenario). At block 628, a priceable features table is read, at block 630, the priceable features table is merged with the table from block 626 to generate the final merged dataset.

At block 630, when a feature is a numeric feature, the process proceeds to block 612 where the numeric feature is normalized into a predetermined range. The process then proceeds to block 636. When, however, at block 630, the feature is not a numeric feature, the process proceeds to block 634 where, for categorical type features, missing category values are replaced with a predetermined label (e.g., "missing") and the feature type is changed to "category."

The process then proceeds to block 636, where the training dataset is ready for training a machine learning model. For example, the training dataset may be stored as machine learning model training data 225 in database 116. To train the machine learning model, the task distribution device 130 may obtain one or more epochs of the stored training dataset, and may train the machine learning model as described herein based on the one or more epochs of training data.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
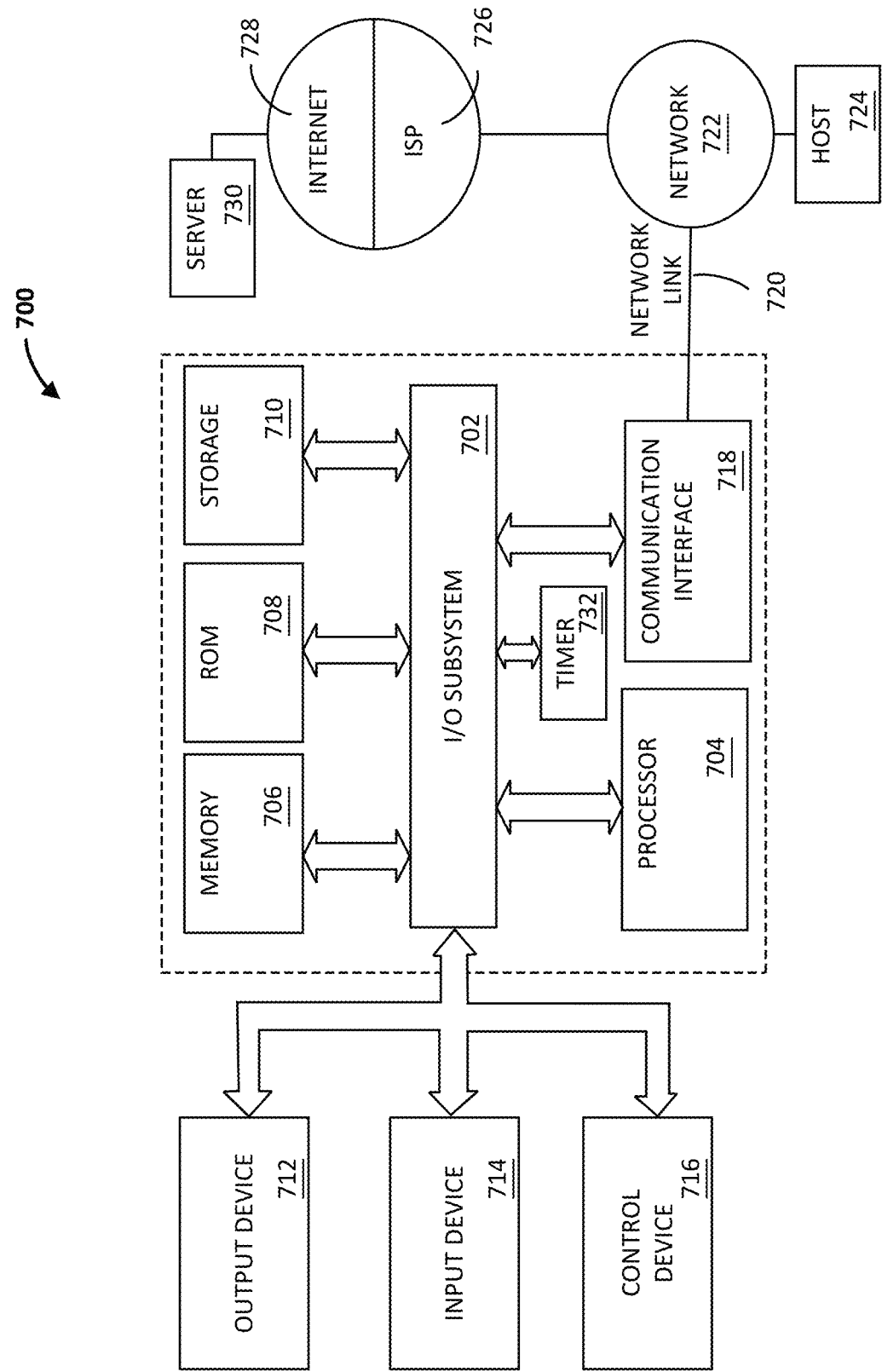
FIG. 7 illustrates a computer system upon which various embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk, or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on the output device 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 710. Volatile media includes dynamic memory, such as memory 706.

Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to I/O subsystem 702. Communication interface 718 provides a two-way data communication coupling to network link(s) 720 that are directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a LAN, WAN, campus network, internetwork, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Computer system 700 may also include a timer 732. The processor 704 may initiate the timer 732 to expire after an interval of time (e.g., 1 second, 1 minute, 10 minutes, etc.). In some embodiments, the processor 704 received an interrupt upon expiration of the timer 732. The processor 704 may, for instance, execute an interrupt service routine (ISR) in response to the interrupt. In some embodiments, the interrupt signals to the processor 704 that a task has failed to complete execution within a time interval that the timer 732 was initiated with.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, application programming interface (API) calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for executing tasks in a distributed computing environment, the method performed by one or more processors and comprising:
   receiving training data including a plurality of workloads performed in the distributed computing environment,
   the training data indicating, for each workload of the plurality of workloads, a plurality of features and an amount of time taken to perform the workload;
   training a machine learning model using an objective function based on the training data,
   the machine learning model learning a plurality of weights associated with the plurality of features of each workload of the plurality of workloads and related to a task weight value for the workload, and
   the objective function including a first hyperparameter for controlling a number of tasks to be performed in the distributed computing environment and a parameter indicating a relationship between the task weight value assigned to each workload and an estimated amount of time required to perform the workload;
   receiving a workload request that includes a new workload with a new set of feature values;
   computing a new task weight value for the new workload using the machine learning model;
   assigning the new workload into one or more new tasks based on the new task weight value; and
   transmitting the one or more new tasks for execution in the distributed computing environment.

2. The method of claim 1, wherein the objective function includes a maximum task weight value for any workload.

3. The method of claim 1, wherein the task weight value is computed based on at least partially on a first weight of the plurality of weights, the first weight associated with a first feature of the new set of feature values having a first feature type, and on a second weight of the plurality of weights, the second weight associated with a second feature of the new set of feature values having a second feature type.

4. The method of claim 1, wherein the objective function depends on an average running time of the plurality of workloads performed in the distributed computing environment.

5. A non-transitory, computer-readable storage medium storing one or more sequences of instructions which when executed cause one or more processors to perform:
   training a machine learning model using an objective function based on a training dataset including a plurality of workloads,
   the machine learning model accepting a plurality of features of a workload and outputting a first task weight value for the workload related to an amount of time required to perform the workload,
   the machine learning model including a plurality of weights to be learned for the plurality of features of the workload,
   the objective function including a hyperparameter for controlling a number of tasks to be performed in a distributed computing environment and a parameter to be learned indicating a relationship between a task weight value for the workload and an estimated amount of time it takes to perform the workload;
   receiving a new request to perform a new workload with a new set of features;
   computing a second task weight value for the new workload based on the new set of features using the trained machine learning model; and
   executing a new task comprising the new workload in the distributed computing environment based on the second task weight value.

6. The non-transitory, computer-readable storage medium of claim 5, wherein the plurality of weights includes a first weight of a first feature of the plurality of features, and a second weight of a second feature of the plurality of features.

7. The non-transitory, computer-readable storage medium of claim 5, wherein the objective function includes a maximum task weight value for any workload.

8. The non-transitory, computer-readable storage medium of claim 5, wherein the second task weight value is computed based at least partially on a first weight of the plurality of weights, the first weight associated with a first feature of the new set of features having a first feature type, and on a second weight of the plurality of weights, the second weight associated with a second feature of the new set of features having a second feature type.

9. The non-transitory, computer-readable storage medium of claim 5, wherein the objective function depends on an average running time over the plurality of workloads performed in the distributed computing environment.

10. A system for distributing tasks in a distributed computing environment, comprising:
    a memory; and
    at least one processor communicatively coupled to the memory, the at least one processor configured to perform:
    training a machine learning model using an objective function based on a training dataset including a plurality of workloads, the machine learning model accepting a plurality of features of a workload and outputting a first task weight value for the workload related to an amount of time required to perform the workload, the machine learning model including a plurality of weights to be learned for the plurality of features of the workload, the objective function including a hyperparameter for controlling a number of tasks to be performed in a distributed computing environment and a parameter to be learned indicating a relationship between a task weight value for the workload and an estimated amount of time required to perform the workload;

receiving a new request to perform a new workload with a new set of features;

computing a second task weight value for the new workload based on the new set of features using the trained machine learning model; and executing a new task comprising the new workload in the distributed computing environment based on the second task weight value.

11. The system of claim 10, wherein the plurality of weights includes a first weight of a first feature of the plurality of features, and a second weight of a second feature of the plurality of features.

12. The system of claim 10, wherein the objective function includes a maximum task weight for any workload.

13. The system of claim 10, wherein the second task weight value is computed based at least partially on a first weight of the plurality of weights, the first weight associated with a first feature of the new set of features having a first feature type, and on a second weight of the plurality of weights, the second weight associated with a second feature of the new set of features having a second feature type.

14. The system of claim 10, wherein the objective function depends on an average running time of a plurality of workloads performed in the distributed computing environment.

15. The system of claim 10, wherein, the at least one processor is configured to perform adjusting at least a first weight of the plurality of weights based on the training.

16. The system of claim 10, wherein the at least one processor is configured to perform:

validating the machine learning model based on a new dataset, the new dataset comprising new feature values for a plurality of new workloads;

the machine learning model accepting the new feature values for the plurality of new workloads and outputting validation task weight values related to the amount of time required to perform the plurality of new workloads; and determining that the machine learning model is to be trained iteratively based on the validation task weight values.

17. The system of claim 10, wherein the at least one processor is configured to perform:

receiving a second new request to perform a second new workload with a second new set of features;

computing a third task weight value for the second new workload based on the second new set of features using the trained machine learning model;

computing an overall weight value based on the second task weight value and the third task weight value;

determining the overall weight value is within a predetermined range; and generating the new task to include the second new workload based on the determination.

18. The system of claim 10, wherein the at least one processor is configured to perform:

receiving a second new request to perform a second new workload;

computing a third task weight value for the second new workload using the trained machine learning model generating the new task based on the third task weight value, the new task comprising the new workload and at least a first portion of the second new workload;

generating a second new task comprising at least a second portion of the second new workload;

transmitting the new task to a first server; and transmitting the second new task to a second server.

19. The system of claim 10, wherein the at least one processor is configured to perform:

adjusting the new task to include a label identifying a type of the new task;

determining that execution of the new task failed to complete within a predetermined amount of time; and storing, within the memory, task failure data identifying the label.

20. The system of claim 19, wherein the predetermined amount of time is proportional to an expected execution time for the type of the new task.

* * * * *